(No Model.) 4 Sheets—Sheet 1.

A. LINDGREN.
CULTIVATOR.

No. 531,200. Patented Dec. 18, 1894.

Fig. I.

Witnesses
Inventor
August Lindgren
By P. Y. Hodge
Attorney

THE NORRIS PETERS CO., PHOTO-LITHO., WASHINGTON, D. C.

(No Model.) 4 Sheets—Sheet 2.

A. LINDGREN.
CULTIVATOR.

No. 531,200. Patented Dec. 18, 1894.

(No Model.)

A. LINDGREN.
CULTIVATOR.

No. 531,200.

4 Sheets—Sheet 3.

Patented Dec. 18, 1894.

on line 4-4.

on line c-c.

Witnesses
Raymond F. James.
F. A. Elmer.

Inventor
August Lindgren
By P. T. Dodge
Attorney (No Model.)  
A. LINDGREN.  
CULTIVATOR.

No. 531,200.  
Patented Dec. 18, 1894.

4 Sheets—Sheet 4.

on line d-d.

on line e-e.

Witnesses  
Raymond F. Barnes  
F. D. Edmin.

Inventor  
August Lindgren  
By F. F. Dodge  
Attorney

UNITED STATES PATENT OFFICE.

AUGUST LINDGREN, OF MOLINE, ILLINOIS, ASSIGNOR TO THE MOLINE PLOW COMPANY, OF ILLINOIS.

CULTIVATOR.

SPECIFICATION forming part of Letters Patent No. 531,200, dated December 18, 1894.

Application filed May 15, 1894. Serial No. 511,325. (No model.)

*To all whom it may concern:*

Be it known that I, AUGUST LINDGREN, of Moline, county of Rock Island, and State of Illinois, have invented a new and useful Improvement in Cultivators, of which the following is a specification.

My invention relates to cultivators, and has reference more particularly to disk cultivators in which gangs of disks are carried by the frame, the disks acting as the machine advances to scrape the soil toward the plants being cultivated.

The invention consists in various improvements designed to render the machine as a whole strong, light and durable, the adjustment of its several parts convenient, and its operation effective.

The invention also consists in the details of construction and combination of parts hereinafter described and claimed.

Figure 1:
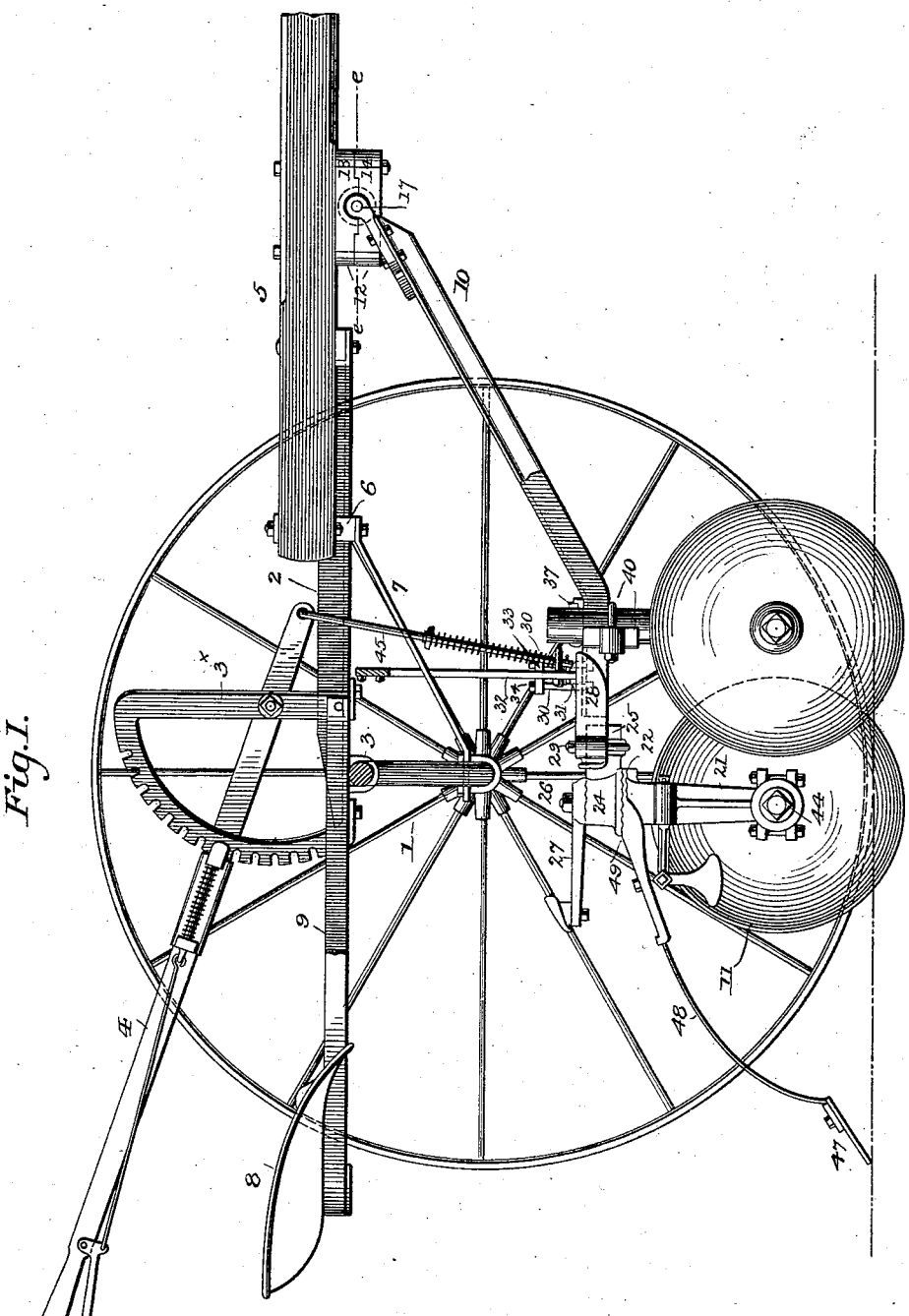
Figure 2:
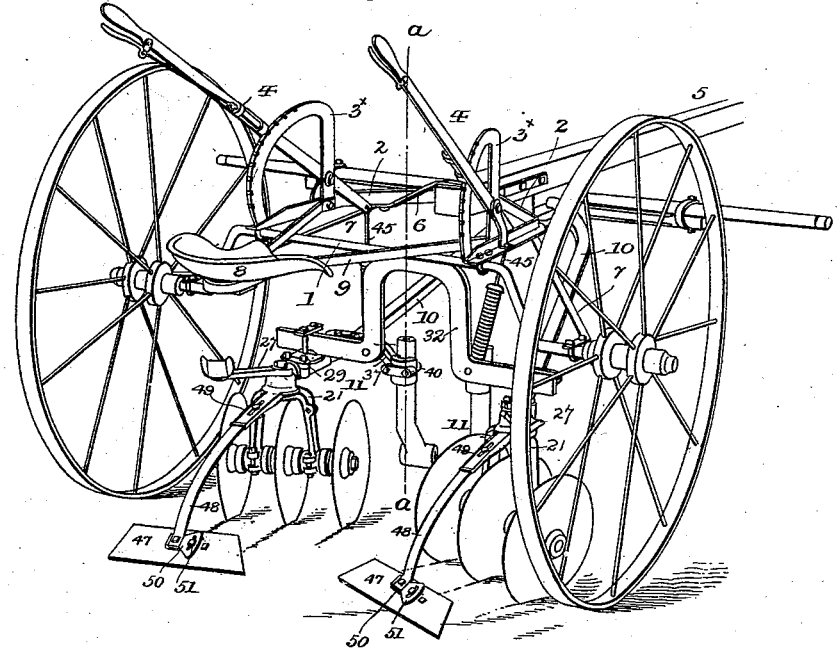
Figure 3:
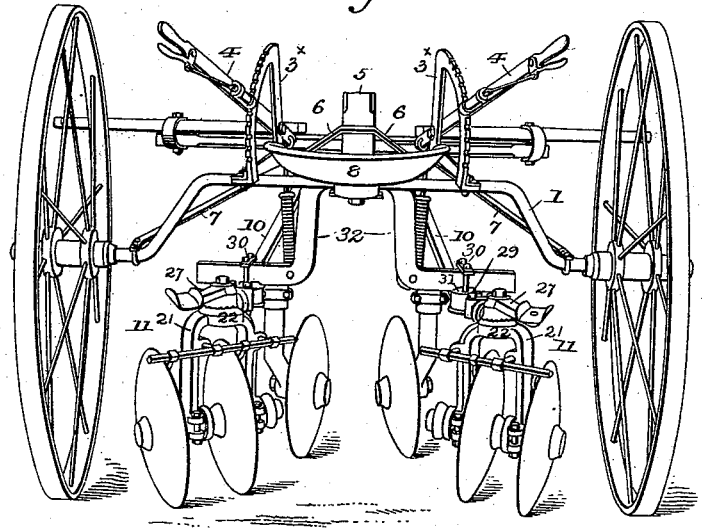
Figure 4:
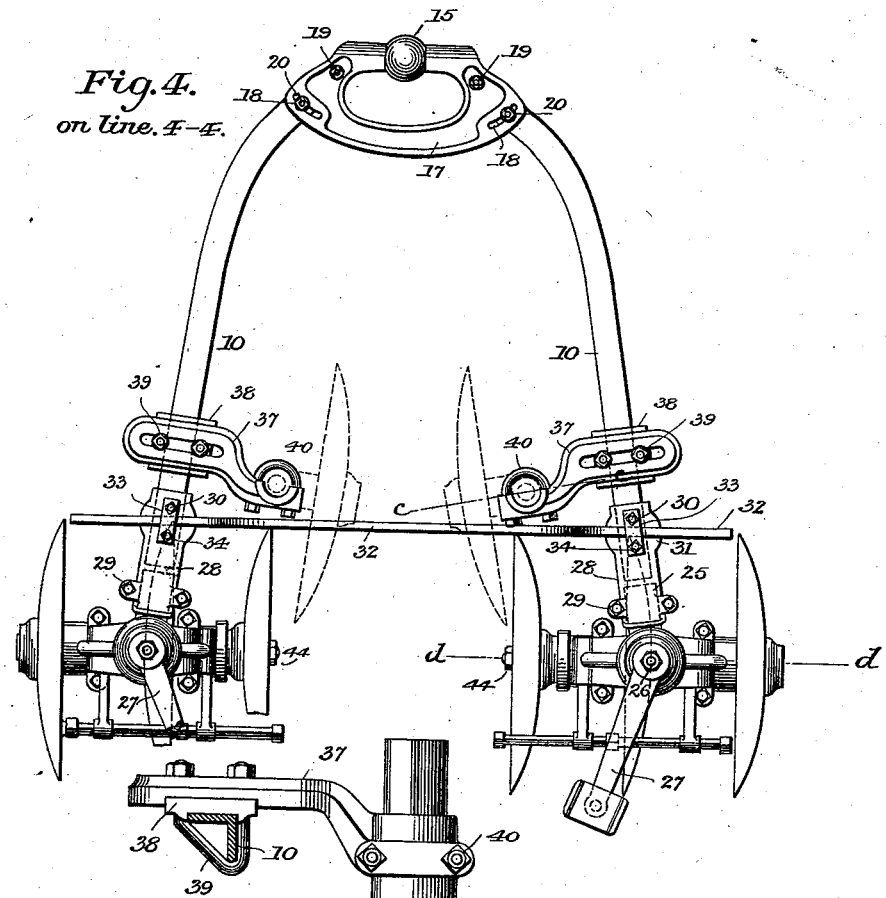
Figure 5:
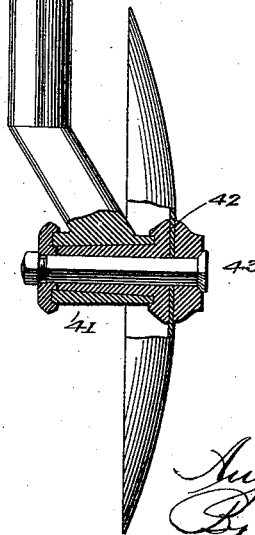
Figure 6:
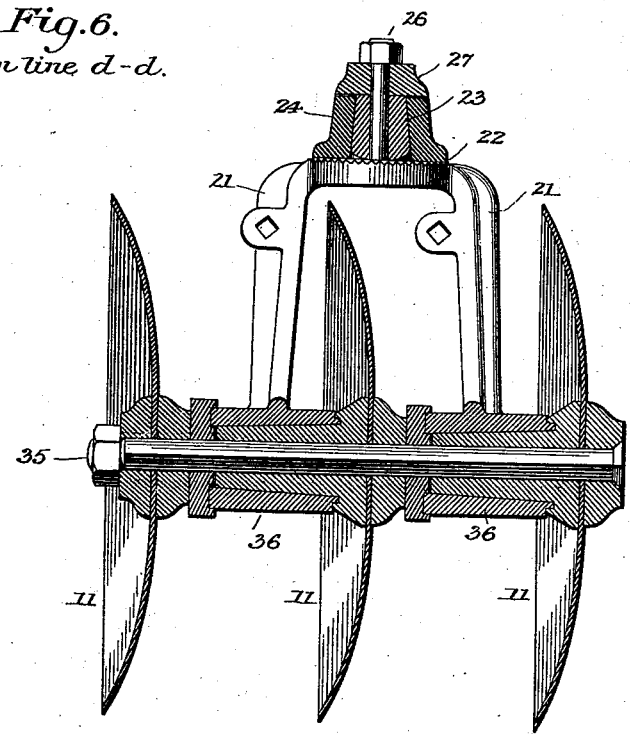
Figure 7:
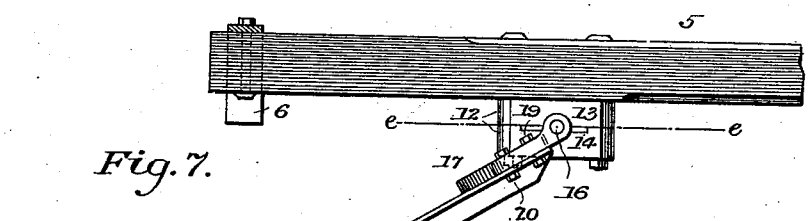
Figure 8:
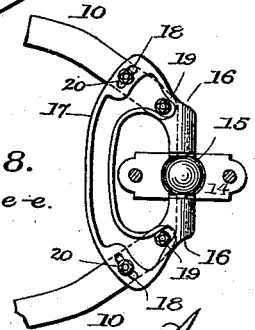

In the accompanying drawings, Figure 1 is a sectional elevation through a cultivator constructed in accordance with my invention on the line $a-a$ of Fig. 2. Fig. 2 is a rear perspective view of the same. Fig. 3 is a similar view with the two adjacent disks removed from their respective gangs and applied to sustaining arms for the protection of small plants. Fig. 4 is a top plan view of the beams and the connected gangs, said parts detached from the frame of the machine. Fig. 5 is an elevation partly in section of one of the disks sustaining standards and the attached disk on the line $c-c$ of Fig. 4. Fig. 6 is a vertical section through one of the gangs on the line $d-d$ of Fig. 4. Fig 7 is an elevation of forward ends of the beams, showing their connection with the tongue. Fig. 8 is a horizontal section on the line $e-e$ of the preceding figure.

Referring to the drawings, 1 represents an arched axle having mounted on its ends two ground wheels.

2 represents a horizontal U-shaped frame, preferably of angle steel, the rear end of which is fixed to the arched portion of the axle by staple bolts 3. Beneath the ends of this frame the lateral bent ends of two segment plates $3^\times$ are seated, which are secured by the bolts and which extend upward, forward and then vertically downward to the under side of the said frame in front of the axle, at which point their ends are firmly secured. The plates are toothed for the engagement of lifting levers 4, more fully described hereinafter. The front portion of this frame is fixed at its center to the under side of a tongue 5 by means of a vertical bolt, the rear end of said tongue being connected by braces 6 to the sides of the U-shaped frame, from which point rods 7 extend to the outer ends of the arched axle to which the ends of the rods are fixed as shown in the drawings.

A driver's seat 8 is sustained on the rear bent end of a seat sustaining frame 9 of angle steel, the sides of said frame extending forward, their ends being secured to the lower ends of the segment plates before alluded to. This seat sustaining frame receives support at its two sides about midway of its length from the arched portion of the axle upon which the frame rests, as shown in Fig. 1.

From this description it will be noted that the frame of my improved cultivator is composed wholly of steel and of comparatively few parts, is light, and strong, and well adapted to support the operative parts of the machine hereinafter described.

10 represents two beams, of angle steel similar to that composing the frame above described. At the front ends the beams are connected together and pivoted to the under side of the tongue, while at their rear ends they are each provided, as more fully described hereinafter, with a gang of three disks 11. The manner of connecting the beams together and pivoting them to the tongue, is shown more particularly in Figs. 7 and 8, in which it will be seen that the tongue near its rear end is provided on its under side with a journal bearing 12 in two parts 13 and 14, connected together by bolts passing through the said parts of the bearing and the tongue. The adjacent meeting faces of the two parts of the bearing are formed with a spherical socket in which a globular enlargement 15 is loosely seated. This enlargement is provided at opposite sides with trunnions 16, upon which the ends of a yoke plate 17 are mounted. The yoke plate extends outward from opposite sides of the tongue, and then laterally beneath the same, the two forward ends of the beams being bolted to the under sides of said plate.

I provide for the independent adjustment of the forward ends of the beams on the yoke plate by slotting the latter transversely as at 18, one bolt 19 connecting the ends of the beams with the plate, while a second bolt 20 passes through the slots of the plate and into the beam. Under this arrangement by loosening the bolts, the two beams may be moved toward or from each other, they turning on the bolts 19 as axes, after which they may be fixed in their adjusted position by tightening up the bolts.

The gangs of disks at the rear ends of the beams are carried by vertical yokes 21, which are each provided near their upper ends with a shoulder 22, having its upper surface serrated. Above the shoulders, the yokes are formed with necks 23, which are encircled by sleeves 24 to which are attached forwardly extending cylindrical arms 25. The lower surfaces of the sleeves are serrated to correspond with the serrations on the shoulders, and the parts are secured together by means of vertical bolts 26, extending upward through the yokes from beneath, the upper ends of the bolts being provided with nuts, as shown, to hold the parts together. Between the nuts and the upper surfaces of the sleeves, the front ends of two arms 27 are seated, the rear ends of the arms being provided with foot plates to facilitate access to the driver's seat. From this description it will be seen that the yokes can each be adjusted around a vertical axis passing centrally through the necks 23, this adjustment admitting of the gangs of disks being set at different angles to the line of advance of the machine according as circumstances may require.

The rear ends of the two beams are connected to the cylindrical arms 25, projecting from the sleeve carrying the gangs, by means of saddle plates 28. These saddle plates are formed at their rear ends to partly embrace the front ends of the said arms to which they are fixed by staple bolts 29, which bolts embrace the lower sides of the arms and extend upward through vertical holes in the saddle plates, the upper ends of the bolts being provided with nuts to hold the parts together. The front ends of the saddle plates are seated upon the rear ends of the beams and extend downward at the sides of the same as shown. They are secured to the beams by two bolts 30, extending vertically upward through the horizontal flanges of the beams and through the overlying saddle plates. Between these bolts the saddle plates are each formed with a boss 31, which is provided with a vertical socket in which sockets are seated the two ends of a transverse connecting yoke 32, which is secured at its ends by plates or washers 33, slipped on to the bolts 30 and clamped against the upper edges of the yoke by nuts 34. It will be observed that the two beams are thus connected both at their front and rear ends forming a rigid frame, which by means of the ball and socket joint connecting it at its front to the tongue, may rock on both a longitudinal and transverse horizontal axis. Aside from the joint adjustment of the gangs due to this construction, they are adjustable independently around a horizontal axis longitudinally of the projecting arms 25, and in addition the gangs are each adjustable to and from each other, and as before stated, around a vertical axis passing centrally through the yoke. I provide, therefore, for the adjustment of all the parts and am enabled by this means to meet the various requirements encountered in practice. The hubs of the disks composing the two gangs are mounted on shafts 35, the two outer hubs revolving in bearings 36 formed on the lower ends of the two yokes 21 before alluded to. The bearings are in two parts connected as usual by vertical bolts extending through ears projecting from the sides of the same.

In operating a machine of this construction, the two gangs are each adjusted so that the disks will extend at a slight angle forward and outward. When the machine is advanced, the disk will scrape the soil and direct the same from both sides to the rows of plants between them, and thus effect the cultivating operation.

In practice it has been found that if no means are provided for protecting very young plants, such as young corn, they will be injured by being covered with the soil thrown inward by the two inner disks of the respective gangs. I obviate this difficulty by removing the two inner disks and attaching them to supplemental disk receiving standards in advance of the gangs, in such position that these two forward disks will act to throw the soil from the plants, the rear disks acting as before to throw the soil toward the plants.

The standards for receiving the disks are preferably tubular in cross section, and are mounted at their upper ends on the inner ends of arms 37, attached to the beams. The outer end of each arm is slotted and seated in a slotted plate 38, which is seated upon the upper side of the beam. A staple bolt 39 embraces the beam and passes at its ends through the slots in the arm and intermediate plate and serves to hold the parts firmly in position while admitting adjustment of the same both longitudinally and transversely of the beam. The inner end of each arm is formed with a curved recess or socket in which the vertical standard is securely clamped by a staple bolt 40, which embraces the standard and extends through the ends of the arm, nuts being provided as shown to hold the parts together. Under this construction the two standards may be adjusted forwardly and rearwardly, to and from each other, upwardly and downwardly and around the vertical axis passing centrally through the same. At their lower ends they are each provided with a hub 41 containing a sleeve 42, to which the disk is applied, and held by a through bolt 43. When the inner disks are to be removed and applied to the standards, the nuts 44 on the inner ends of the two shafts 35 are removed, and the two disks taken off and applied to the standards, after which the nuts may again be screwed onto the shafts. The beams are raised and lowered by means of the two lifting levers 4, before alluded to, which are pivoted to the vertical portions of the segment plates 3, and are provided with dogs to engage the teeth thereon. The lower end of each lever is jointed to a rod 45, which extends downward through an eye in the transverse connecting yoke below which eye the rod is provided with a transverse pin. A spiral spring encircles the rod between the eye and a washer fixed to the rod, and tends normally to hold the beams downward with a yielding pressure. When the levers are depressed they lift the beams bodily, and when the levers are raised, they compress the springs and depress the beams, and being locked in this position, the beams are held to their work with a yielding pressure.

In certain cases I provide the two gangs with leveling or smoothing attachments 46. Each of these devices comprises a flat blade 47 sustained in an inclined position at the lower end of a spring arm 48, the upper end of which is adjustably secured in a socket in a plate 49 by slotting the arm longitudinally and connecting the parts by a bolt. The plates are formed at their upper ends with openings and are slipped over the necks of the yokes beneath the sleeves 24, before alluded to, they being held by means of the vertical bolts before described for securing the sleeves adjustably to the yokes. This arrangement will admit of the arms and the blades at their lower ends being adjusted to and from each other, the arms turning at their upper ends around vertical axes. The blades are each connected to the lower ends of the arms, so that they can be adjusted, the connection consisting of a plate 50, bolted at one end to the blade and formed at its other end with a curved slot through which a bolt 51 passes. The lower end of the spring arm is bolted to this plate and to the blade and when the latter is to be adjusted, it is turned on this bolt as an axis, the other bolt passing through the slot in the plate, serving to hold the blade in the position to which it may be adjusted.

It is to be understood that while I have described and claimed the two gangs as being connected in the peculiar manner to the beams to admit of various adjustments, it is obvious that these gangs may be similarly connected to the rigid frames of machines wherein no beams are employed, the effect of such adjustments being in no manner changed by their application in this connection. The claims, therefore, while specifying such adjustments in connection with beams, are intended to cover the constructions for effecting these adjustments whether applied in connection with beams or otherwise, as above specified.

Having thus described my invention, what I claim is—

1. In a cultivator the combination of the frame, the journal bearing thereon having a spherical socket, the globular enlargement mounted in said socket and provided with trunnions, a yoke plate mounted on said trunnions and two beams adjustably connected to said yoke plate.

2. In a disk cultivator the combination with the two gangs of disks, of disk receiving standards mounted in advance of the disks and adjustable longitudinally and transversely of the machine.

3. The combination in a disk cultivator, of the beams, the gangs of disks at their rear ends, and the supplemental disk-supporting arms mounted on the beams and adjustable thereon in a longitudinal direction.

4. The combination of the beams, the disk gangs at the rear ends of the same, the two horizontal arms connected to the beams in advance of the gangs and adjustable bodily in a straight line transversely of the same said arms having vertical sockets at their inner ends and vertical disk receiving standards adjustably mounted in said socket.

5. The combination in a disk cultivator, of the beams, the disk gangs at their rear ends, the inwardly extending arms slotted at their outer ends and provided with sockets at their inner ends, the staple bolts embracing the beams and extending through the slots, the vertical standards seated in the sockets in the arms, and the staple bolts embracing the standards and extending through the ends of the arms.

6. In a disk cultivator the combination of the beams, the yokes sustaining at their lower ends the gangs of disks, the sleeves in which the yokes are mounted at their upper ends the forwardly extending cylindrical arms projecting from the sleeve, the saddle plates embracing said arms, and the rear ends of the beams, devices for securing the saddle plates and cylindrical arms together, the transverse connecting yoke, and devices for connecting the ends of the yoke with the saddle plates and beams.

7. In a disk cultivator the combination of the frame, the beams pivoted thereto and adjustably connected at their front and rear ends, the gangs of disks on the rear end of the beams adjustable around longitudinal and vertical axes, and the two vertical disk receiving standards connected to the beams in advance of the gangs and adjustable transversely of the beam and around vertical central longitudinal axes.

In testimony whereof I hereunto set my hand, this 9th day of March, 1894, in the presence of two attesting witnesses.

AUGUST LINDGREN.

Witnesses:
F. G. ALLEN,
W. B. WATT.